(12) United States Patent
Wendel et al.

(10) Patent No.: US 8,226,385 B2
(45) Date of Patent: Jul. 24, 2012

(54) MOTOR CENTRIFUGAL PUMP HAVING COOLANT PUMP

(75) Inventors: Rolf Wendel, Rehau (DE); Dieter Waechter, Thiersheim (DE); Andreas Zeiss, Tauperlitz (DE); Bernd Huster, Muenchberg (DE)

(73) Assignee: Wilo AG, Dortmund (DE)

( * ) Notice: Subject to any disclaimer, the term of this patent is extended or adjusted under 35 U.S.C. 154(b) by 800 days.

(21) Appl. No.: 12/439,008

(22) PCT Filed: Aug. 7, 2007

(86) PCT No.: PCT/EP2007/006951
§ 371 (c)(1),
(2), (4) Date: Mar. 16, 2009

(87) PCT Pub. No.: WO2008/025437
PCT Pub. Date: Mar. 6, 2008

(65) Prior Publication Data
US 2009/0324436 A1    Dec. 31, 2009

(30) Foreign Application Priority Data
Aug. 26, 2006  (DE) .......................... 10 2006 040 048

(51) Int. Cl.
*F02B 39/00* (2006.01)
*H02K 9/00* (2006.01)
(52) U.S. Cl. .................. 417/423.8; 417/407; 417/410.1; 310/54; 310/52
(58) Field of Classification Search ............... 417/423.8, 417/420, 407, 410.1; 310/52–59, 62, 63, 310/87, 89
See application file for complete search history.

(56) References Cited

U.S. PATENT DOCUMENTS

| | | | |
|---|---|---|---|
| 3,014,639 A | 12/1991 | Boli | 417/243 |
| 5,398,762 A | 3/1995 | Stinessen | 166/356 |
| 5,839,397 A | 11/1998 | Funabashi | 123/41.01 |
| 7,429,809 B2 | 9/2008 | Huster | 310/54 |

FOREIGN PATENT DOCUMENTS

| | | |
|---|---|---|
| DE | 426945 | 3/1926 |
| GB | 2042084 | 9/1980 |
| JP | 2002115548 | 4/2002 |

*Primary Examiner* — Joseph L Williams
(74) *Attorney, Agent, or Firm* — Andrew Wilford

(57) ABSTRACT

The invention relates to a motor centrifugal pump, particularly as an immersion pump, having a coolant pump that is driven by the electric motor, the pump circulating the coolant of the electric motor and the impeller thereof being driven by the electric motor, wherein the impeller shaft of the coolant pump is connected to the motor shaft via a transmission.

20 Claims, 2 Drawing Sheets

MOTOR CENTRIFUGAL PUMP HAVING COOLANT PUMP

CROSS REFERENCE TO RELATED APPLICATIONS

Figure 1:
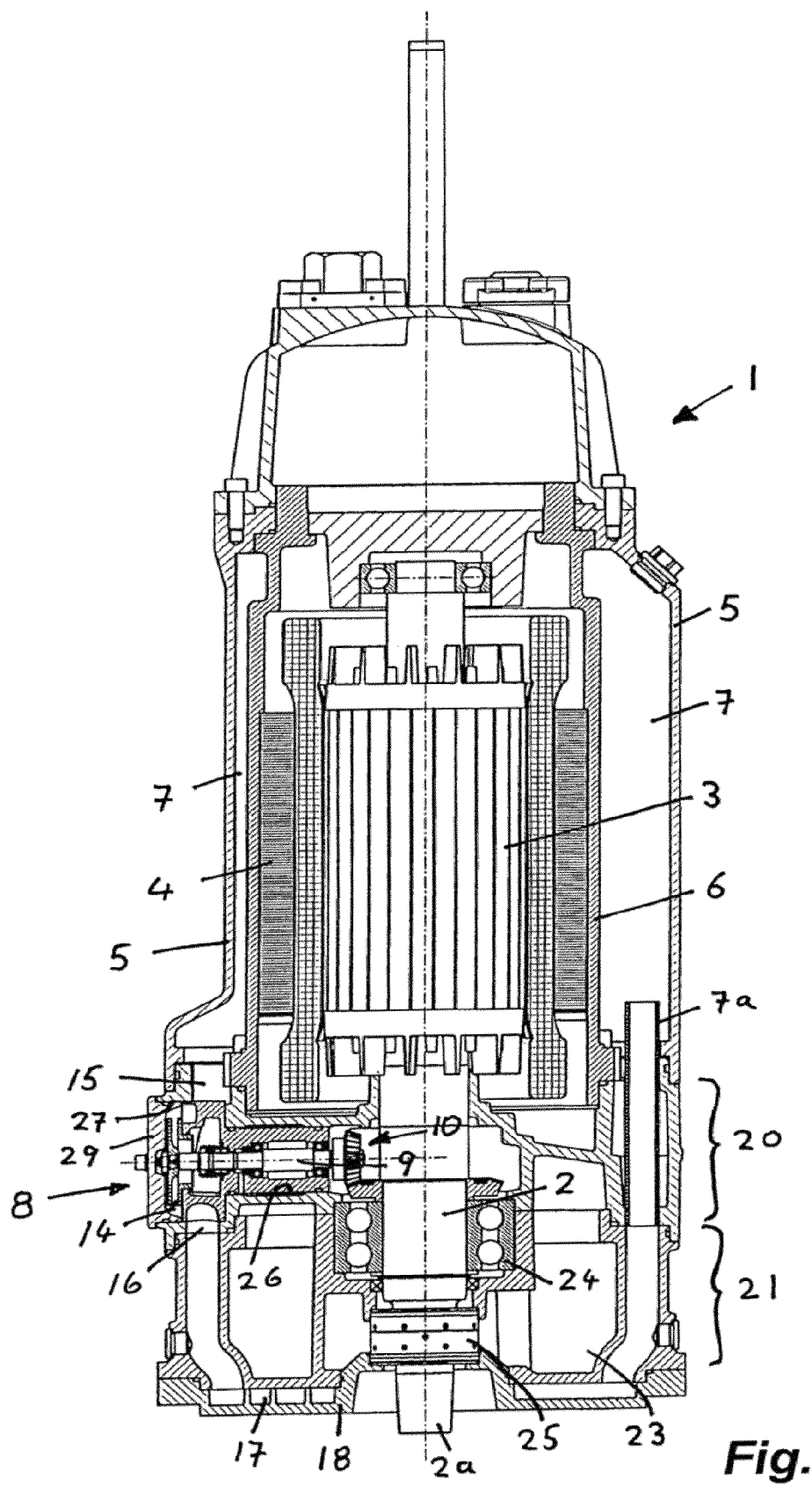

This application is the US national phase of PCT application PCT/EP2007/006951, filed 7 Aug. 2007, published 6 Mar. 2008 as WO2008/025437, and claiming the priority of German patent application 102006040048.8 itself filed 26 Aug. 2006, whose entire disclosures are herewith incorporated by reference.

The invention relates to a motorized centrifugal pump, in particular a submersible pump, having a coolant pump that is driven by an electric motor and that circulates the coolant of the electric motor and whose impeller is driven by the electric motor.

Large electric motors require coolers to dissipate heat. Both gases and also liquid media are used as the coolant. Because convection is typically insufficient for dissipating the waste power, fans or pumps are primarily used to circulate it.

The object of the invention is to improve coolant circulation of an electric motor in such a way that, with simple manufacture, a construction is produced that allows simple mounting and that is readily conforms the cooling power to meet demand.

This object is achieved according to the invention in that the impeller shaft of the coolant pump is connected via a transmission to the motor shaft.

Such a coolant pump is especially easily installable and uninstallable radially to the motor shaft and requires little space. It is particularly inserted into the motor radially. It is especially advantageous to this end if a housing wall is provided between the motor housing and the housing of the centrifugal pump or a further housing wall, in which the coolant pump is mounted. In this way, a high flexibility and multiple adaptions are possible. It is especially advantageous if the coolant pump fits snugly complementarily in a chamber of the housing wall.

Further advantageous embodiments of the invention are listed in the subclaims.

Figure 2:
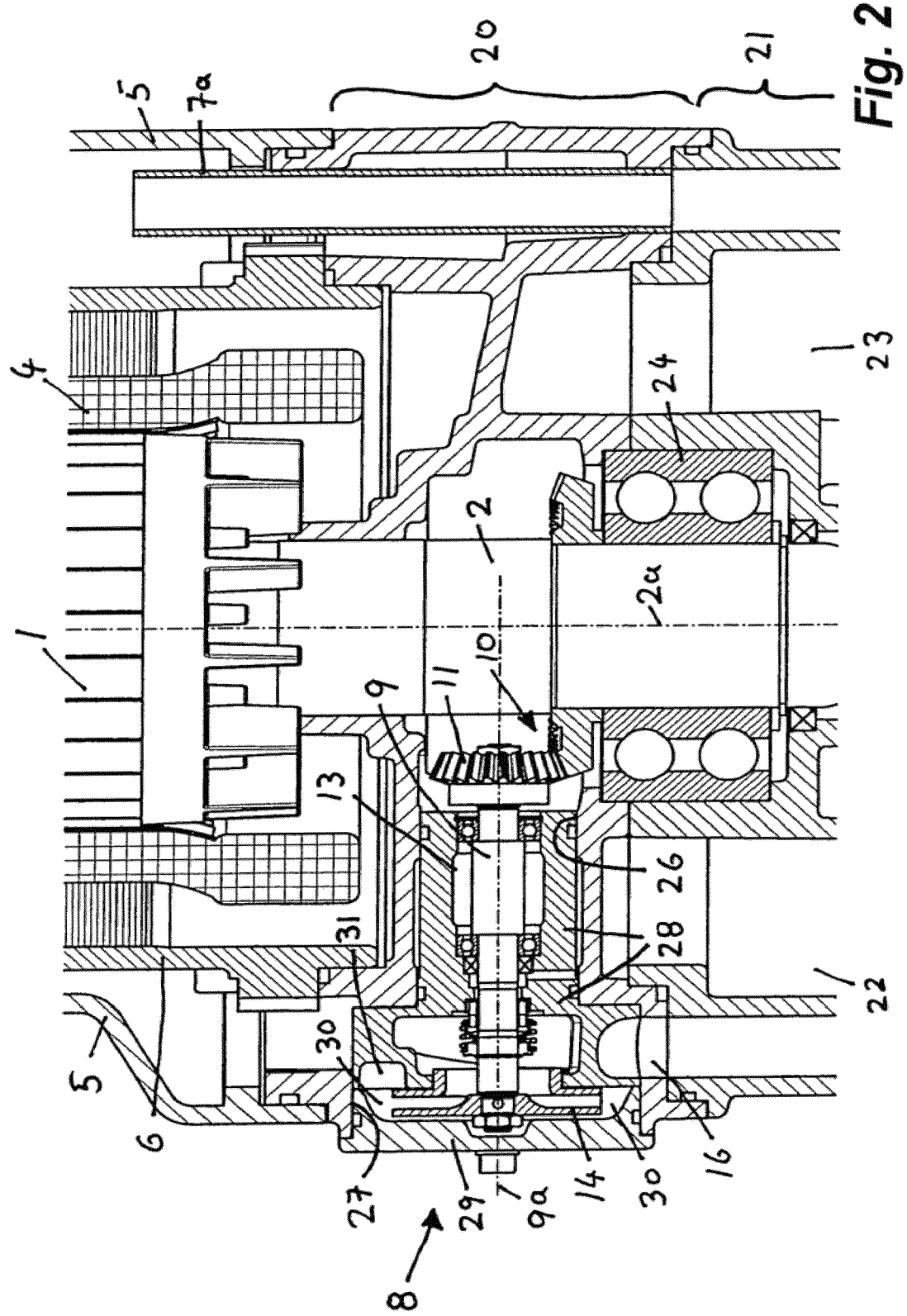

An illustrated embodiment of the invention is shown in the drawings and is described in greater detail hereafter. In the figures:

FIG. 1 shows an axial section through an electric motor of a motorized centrifugal submersible pump and FIG. 2 shows a detail from FIG. 1.

The electric motor 1 of a motorized centrifugal pump has a shaft 2 on which is mounted a rotor 3 that is surrounded by a stator coil 4. A lower end of the motor shaft 2 is coaxially connected to in particular the shaft of a rotor of a centrifugal pump (not shown), the pump housing being fastened on a part 18 of the motor housing. The motor pump is preferably used vertical (with vertical motor and pump shafts) as a submersible pump.

The inner motor housing 6 is coaxially enclosed by an outside housing 5 that forms a partly cylindrical annular chamber 7 of a coolant path with the motor housing, coolant liquid being circulated by a separate pump 8 whose shaft is driven by a bevel gear pair 10 off the motor shaft 2 and that is referred to hereafter as the "coolant pump" 8. The coolant pump 8 pumps the coolant into the annular chamber 7 via a vertical riser pipe 7a, the annular chamber being widened to accommodate the riser pipe. A shaft 9 of the coolant pump 8 is mounted in an axial and radial bearing 13, extends perpendicular to the motor shaft 2, and carries a bevel gear 11 on its inner end, which meshes with a bevel gear 12 on the motor shaft 2. The gears 11 and 12 of the pair 10 have a transmission ratio of 1:2 to 1:3 (preferably 1:2.6) and ensure that the speed of the coolant pump 8 is significantly higher than that of the motor 1.

The coolant pump 8 sucks the coolant out of the annular chamber 7 using its impeller 14 via the suction connecting piece and via an upper passage 15 and conveys it via the pressure connecting piece and a coaxial lower passage 16 into cooling passages 17 of a cooling flange 18 that an end wall of the pump chamber and exchanges heat between the coolant liquid and the conveyed medium.

Two housing portions 20 and 21 are provided between the inner motor housing 6 and the pump housing (not shown), which have essentially the same circumference and diameter and of which the upper portion carries and/or encloses the coolant pump 8 with the annular wall portion 20. The lower housing portion 21 connects the housing wall 20 via the cooling flange 18 to the housing of the pump and/or the pump chamber and forms a leak chamber 22 and an oil chamber 23. Furthermore, a bearing 24 and a cassette seal 25 of the motor shaft 2, which extends through the two portions 20 and 21, are situated in the lower housing portion 21.

The housing wall 20 forms an externally accessible seat 26 that is open laterally toward the outside of the electric motor 1 (at opening 27), as long as the opening 27 is not covered. The coolant pump 8 with its housing 28 is insertable in a formfitting way from the outside into the chamber 26, the external dimensions of the coolant pump housing 28 corresponding to the internal dimensions of the seat 26. The electrical connections of the coolant pump 8, in particular for sensors to the electrical terminals in the seat 26, are effected via plug connections that are externally mounted on the housing 28 and are internally secured in the seat 26, so that the connections are closed after the insertion of the coolant pump 8.

In the same way, the hydraulic connections of the passages 15 and 16 to the pump fittings, which align with one another in the interior and exterior walls, are produced by insertion of the coolant pump 8 into the seat 26. After insertion of the coolant pump 8, the seat 26 and/or its opening 27 is closed by a cover 29 that put on or inserted from the outside.

In the illustrated embodiment, the seat 26 is open toward the side of the housing wall 21 when the cover 29 is removed. The cover 29 may be dispensed with if the seat 26 and its opening 27 are filled up completely by the housing 28 of the coolant pump 8.

In this case, the coolant pump and its housing may protrude laterally beyond the portion 20. In the latter case, an arched cover may enclose the protruding housing 28.

The pump chamber 30 of the coolant pump 8 forms a spiral chamber around the impeller 14, or a coiled or helical chamber having a lateral extension 31 similar to a lateral passage, because of which the external dimensions of the housing 28 are small radially and thus the pump housing 28 has a smaller diameter.

The invention claimed is:

1. A motorized centrifugal pump having a coolant pump that is driven by an electric motor, that circulates the coolant of the electric motor, and whose impeller is driven by the electric motor wherein the impeller shaft of the coolant pump is connected via a transmission to the motor shaft.

2. The motorized centrifugal pump according to claim 1, wherein the coolant pump is a radial centrifugal pump.

3. The motorized centrifugal pump according to claim 1 wherein the transmission between motor shaft and the impeller shaft of the coolant pump is a bevel gear pair or a belt drive.

4. The motorized centrifugal pump according to claim 1 wherein a housing wall in which the coolant pump is mounted is provided between the motor housing and the housing of the centrifugal pump or a further housing wall.

5. The motorized centrifugal pump according to claim 4 wherein the coolant pump is inserted in a formfitting way in a chamber of the housing wall.

6. The motorized centrifugal pump according to claim 5, wherein the chamber is externally closed by a cover.

7. The motorized centrifugal pump according to claim 6, wherein an inner side of the cover forms a side of a spiral chamber of the coolant pump.

8. The motorized centrifugal pump according to claim 1 wherein the pump spiral chamber of the coolant pump has a spiral passage that is situated laterally to the impeller.

9. The motorized centrifugal pump according to claim 4 wherein the coolant pump is externally removable and insertable.

10. The motorized centrifugal pump according to claim 4 wherein the housing wall is removably fastened on the motor housing and on the pump housing or on a further housing wall.

11. The motorized centrifugal pump according to claim 1 wherein to achieve a higher speed of the coolant pump than the motorized centrifugal pump, the transmission between the motor shaft and the impeller wheel of the coolant pump has a transmission ratio of 1:2 to 1:3.

12. The motorized centrifugal pump according to claim 1 wherein an impeller axis of the coolant pump is essentially perpendicular to the motor axis.

13. A pump drive comprising:
a motor housing;
a stator in the housing;
a rotor in the housing having a shaft extending along a rotor axis, the housing being formed with a coolant passage;
a coolant pump mounted on the housing and having an impeller in the passage; and
a transmission connecting the impeller to the rotor for rotation of the impeller by the rotor.

14. The pump drive defined in claim 13 wherein the coolant pump is an axial-input/radial output pump and the impeller rotates about an impeller axis substantially perpendicular to the rotor axis.

15. The pump drive defined in claim 14 wherein the transmission is a pair of bevel gears, one of the gears being mounted on the impeller and rotatable therewith about the impeller axis, the other of the gears being mounted on the rotor and rotatable therewith about the rotor axis.

16. The pump drive defined in claim 13 wherein the housing is formed with a seat open radially outward relative to the rotor axis, the pump having a pump housing fitting generally complementarily in the seat, the impeller being journaled in the pump housing.

17. The pump drive defined in claim 16 wherein the pump housing is releasably secured in the seat.

18. The pump drive defined in claim 13 wherein the transmission is a step-up transmission from the rotor to the impeller and has a ratio of between 1:2 and 1:3.

19. The pump drive defined in claim 14 wherein the passage extends at least partially as a spiral relative to the rotor axis.

20. The pump drive defined in claim wherein the motor housing has an end plate in which the spiral is formed and that is securable to a centrifugal pump.

* * * * *

UNITED STATES PATENT AND TRADEMARK OFFICE
CERTIFICATE OF CORRECTION

PATENT NO.         : 8,226,385 B2
APPLICATION NO.    : 12/439008
DATED              : July 24, 2012
INVENTOR(S)        : Rolf Wendel et al.

Page 1 of 1

It is certified that error appears in the above-identified patent and that said Letters Patent is hereby corrected as shown below:

Title Page, Item (73) should read

-- Assignee: Wilo SE, Dortmund (DE) --

Signed and Sealed this
Thirtieth Day of April, 2013

Teresa Stanek Rea
*Acting Director of the United States Patent and Trademark Office*